March 18, 1941. A. R. LINTERN ET AL 2,235,642
VEHICLE VENTILATING AND HEATING APPARATUS
Filed April 3, 1937 2 Sheets-Sheet 2
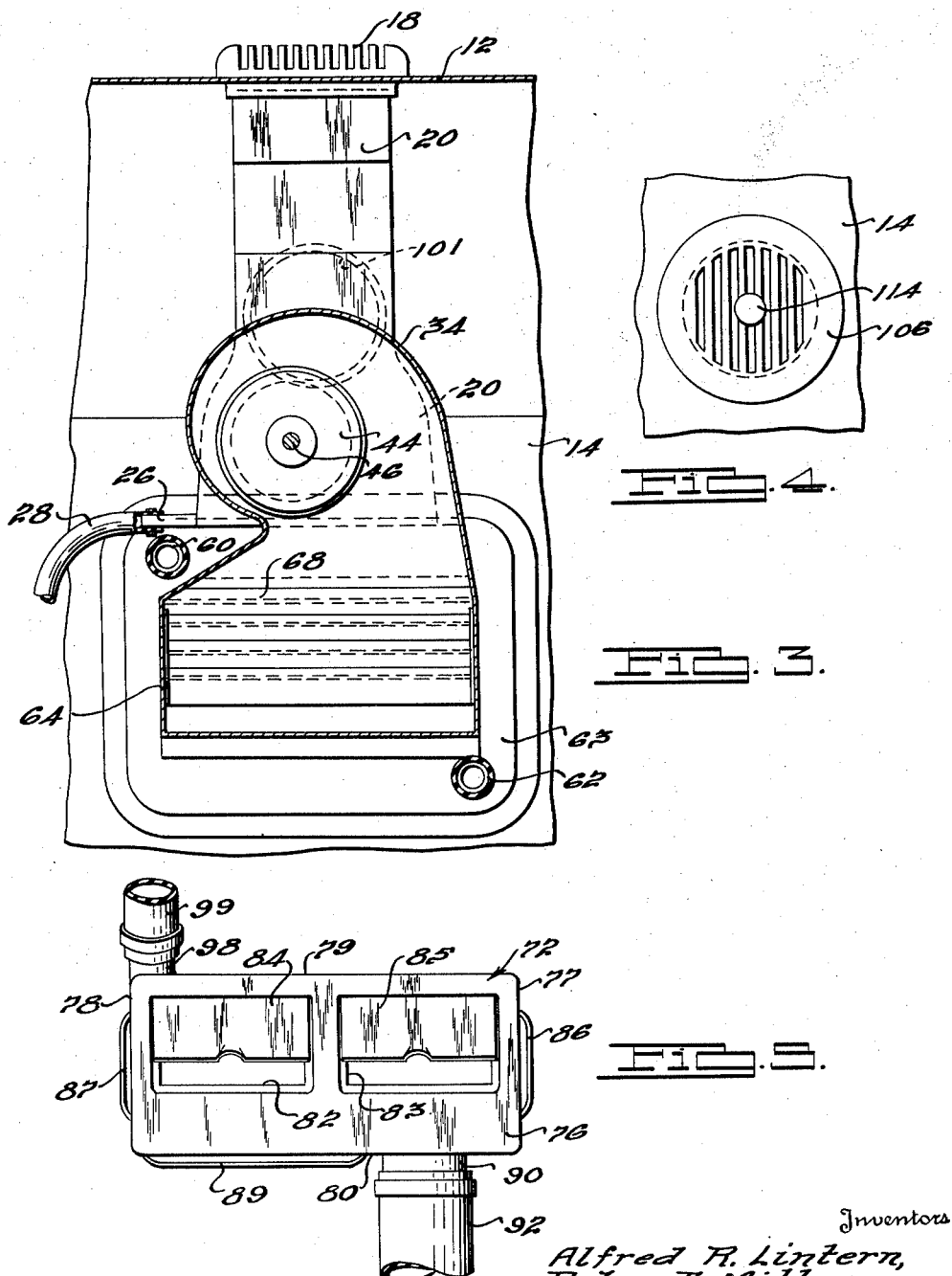
Inventors.
Alfred R. Lintern,
Peter J. Miller,
William T. Downs.
By Harness, Dickey & Pierce.
Attorneys Patented Mar. 18, 1941

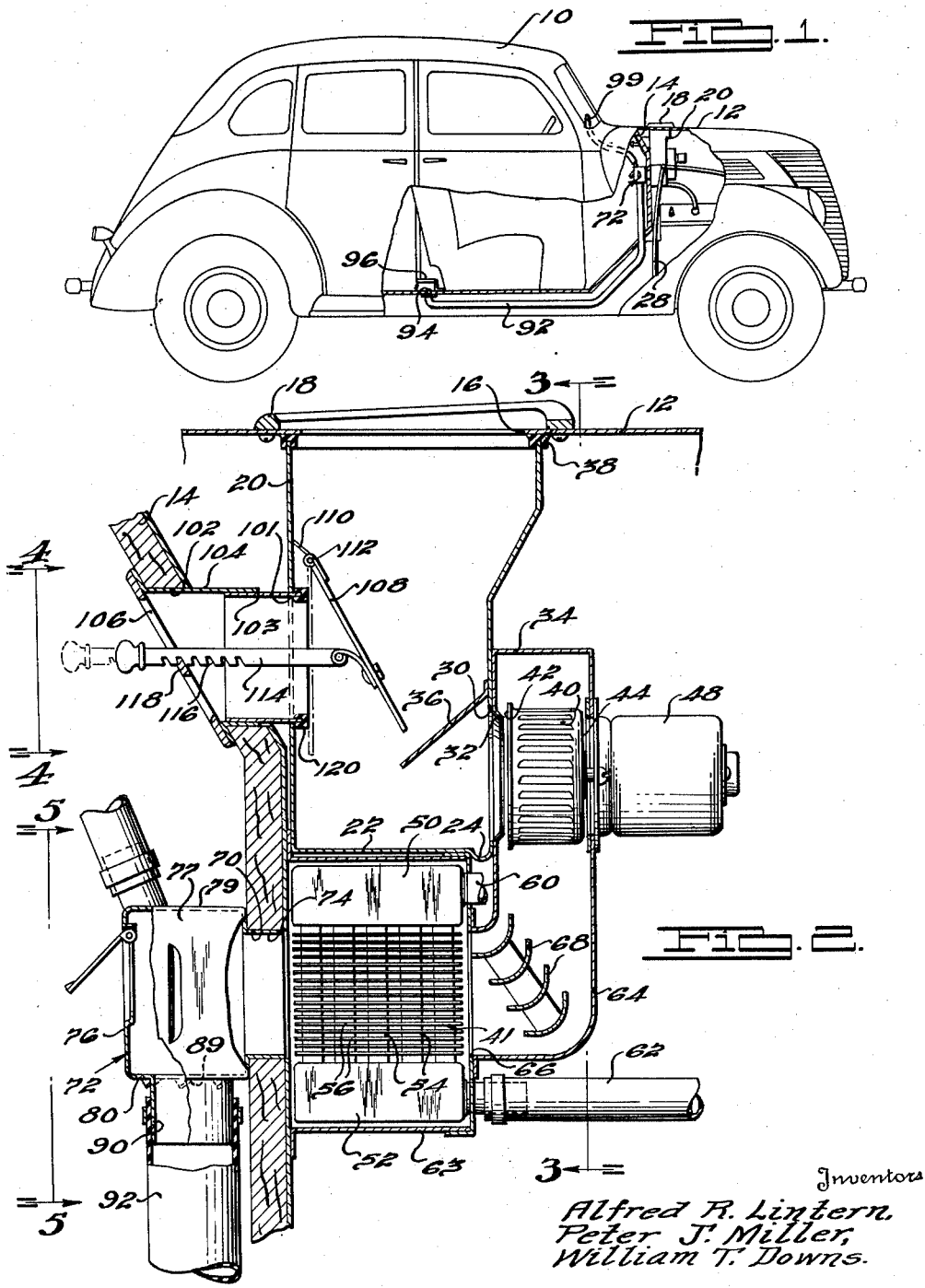

2,235,642

UNITED STATES PATENT OFFICE 2,235,642

VEHICLE VENTILATING AND HEATING APPARATUS

Alfred R. Lintern, Peter J. Miller, and William T. Downs, Detroit, Mich., assignors to Evans Products Company, Detroit, Mich., a corporation of Delaware Application April 3, 1937, Serial No. 134,770

9 Claims. (Cl. 98—2)

This invention relates to improved vehicle ventilating and heating apparatus for automotive vehicles.

Objects of the invention are to provide an improved and simplified means for supplying fresh heated air into the interior of a vehicle body; to provide improved and simplified means for distributing heated air within the interior of a vehicle body; to provide improved means for maintaining the passenger compartment of the vehicle at a proper and comfortable temperature; to provide means associated with a vehicle body heating means for directing a portion of the heated air against the inner face of the vehicle windshield to prevent the formation of frost and ice thereon; to provide an improved structure (or specifically a hot water heater associated with an air intake opening in an automobile hood) for conducting fresh heated outside air into the interior of a vehicle without carrying therewith any foreign material such as water, dust, or the like; and to provide an improved arrangement of air inlet means, fan (or specifically a centrifugal blower) and heat exchange unit, and air distributing means which are economical to manufacture and assemble and take up a minimum of space within the vehicle.

Other objects of the invention are to provide a compact readily installable hot water core type automobile heater which will supply all fresh heated air if desired and which heater is so constructed and arranged that it can be mounted in the engine compartment on the front of the fire wall or dashboard and take in fresh air through a hood opening, and which can be easily installed in almost all forms of automobiles.

Other objects of the invention will become apparent from the following specification, the drawings relating thereto, and from the claims hereinafter set forth.

In the drawings in which numerals are used to designate like parts in the several views throughout:

Figure 1 is a side elevational view of a conventional vehicle having parts broken away illustrating the construction and arrangement of a ventilating and heating structure embodying features of the present invention;

Fig. 2 is an enlarged partial vertical cross sectional view of the construction and arrangement of the ventilating and heater structure illustrated in Fig. 1;

Fig. 3 is a cross sectional view, showing parts in elevation, taken substantially along the line 3—3 of Fig. 2;

Fig. 4 is a fragmentary elevational view taken substantially along the line 4—4 of Fig. 2; and Fig. 5 is a fragmentary elevational view taken substantially along the line 5—5 of Fig. 2.

It is recognized that it is important when providing means for heating the interior of a passenger vehicle that such means be of such a construction that they may be arranged to take up a minimum of space within the passenger compartment. This is particularly true of hot water core type heaters which are of necessity bulky and which hence take up space normally occupied by the passengers' feet in many of the present conventional installations. Also, although it is highly desirable to take in and heat fresh outside air, yet such an installation is difficult in already built conventional type automobiles since it is not practical to take in air from the existing cowl ventilator due to obstructions, and it is disadvantageous to take in air from under the hood since engine fumes will be drawn in. According to the present invention such simplified means for heating fresh outside air are provided which may be readily mounted within the engine compartment of the vehicle and the space within the passenger compartment is thereby conserved. Also according to the present invention, a structure is provided by which air within the passenger compartment may be re-circulated through the heater for re-distribution within the passenger compartment along with the freshly heated air if desired. It has been found that this re-circulation of the air within the passenger compartment is only necessary in extreme cases such as when first starting or in extremely cold weather and that the heater and air distribution means arranged according to the present invention are sufficient alone under most conditions to supply fresh heated air into the interior of the vehicle body to thereby maintain the passenger compartment at a suitable comfortable temperature without re-circulation.

Also according to the present invention simplified air distribution ducts are provided by which the heated air may be suitably and properly distributed within the passenger compartments.

For a better understanding of the invention, reference may be had to the drawings in which a vehicle 10 is illustrated having a conventional upwardly movable hood member 12 and a conventional dashboard or firewall 14, which separates the passenger compartment and the engine compartment of the vehicle.

It will be apparent that the heating and ventilating unit as a whole is narrow and is adapted to be mounted on the dash along side of the engine.

In order to provide a fresh air inlet an opening 16 is provided through the upwardly movable hood member 12 immediately forwardly of the front face of the dashboard 14. A grille member 18 is suitably secured to the exterior hood and has an opening therethrough in alignment with the opening 16.

It will be apparent that this grille covered opening 16 is located in front of the windshield and in a region where there will be a relatively high air pressure when the vehicle is in forward motion. Thus, even without any blower or without turning on the blower motor, air may be forced into the vehicle and, if used, it is aided by this air pressure. The location of the air intake opening 16 on the top of the hood is also advantageous since the air taken from this higher level will be much freer of exhaust gases and dust of other motorists than it would be if it were taken in at a lower level. The open grille member 18 will prevent entry of stones, leaves, etc., besides having a decorative effect.

For confining the passage of air passed through the inlet opening 16 in its passage for discharge into the interior of the vehicle, a downwardly extending conduit member 20 is provided. The member 20 is open at its upper end and is positioned immediately below the opening 16 and extends downwardly with the lower end 22 thereof closed. A trough 24 is formed along the front lower edge of the member 20 and is preferably sloped to one side for draining any water, or the like, collected within the member 20 to the exterior of the member. An opening is provided through the member 20 adjacent one end of the trough 24, and a short tubular member 26 is suitably connected to the exterior of the member 20 communicating with the interior thereof. A flexible tubular member 28 is preferably provided and secured to the short tubular member 26 for carrying the water to a convenient position for discharge.

In order to provide an effective seal between the upper edge of the channel formed by the member 20, a resilient strip member 38 of a material such as sponge rubber is suitably secured to the upper edge of the member 20 and resiliently bears against the under face of the hood member 12 when the hood member is in normally closed position.

An air discharge opening 30 is provided in the front face of the member 20 adjacent the bottom thereof for communication with an inlet 32 of a blower housing 34. A baffle member 36 is preferably mounted adjacent the upper edge of the opening 30 and slopes downwardly and inwardly within the conduit member 20 so as to prevent the direct passage of air through the opening 30 and thereby prevent the passage of any foreign material such as dirt or rain through the opening 30.

To provide for aiding in drawing the air inwardly through the conduit 20 and forcing air into the passenger compartment in a heated condition, a fan or blower 40 and heat exchanger or hot water core 41 are mounted within the engine compartment in a particularly advantageous manner to be now described.

The fan 40 is preferably of the centrifugal blower type since this type is by far the most efficient in forcing air against an appreciable resistance such as the core here or in drawing through passages as in the present installation. It has an open inlet face 42 and a closed face 44, the blower being fixedly secured to a short shaft 46 which is driven by suitable motor 48. The motor 48 is suitably secured to the blower housing 34; and the blower 40 is mounted within the housing 34 with the inlet face 42 of the blower in axial alignment with the opening 32 of the housing. Thus it will be apparent that the motor and blower are removably mounted as a unit on the front wall of the housing 34. The motor being outside to reduce the size of the whole unit. The outer periphery of the centrifugal blower preferably extends slightly beyond the annular edge of the opening 32, and the opening 32 is preferably formed with an inwardly directed annular flange for confining the passage of air into the center of the blower.

It will be noted that the opening 32 is spaced above the bottom of the upright conduit or passage 20. This closed space at the bottom of the passage 20 provides a trap into which dirt, rain, etc. which may enter through the grille 18 will be caught, and thus this structure aids in cleaning the air taken through the heating and ventilating system.

A heat exchange unit or hot water core 41 which is of the conventional type includes a hot water core comprising an upper header 50, a lower header 52, and tubular members 54 connecting the upper and lower heads. Transversely extending spaced fins 56 are suitably secured to the tubular member 54 in the usual way. Water inlet and outlet pipes 60 and 62, respectively, communicate with the headers 50 and 52, respectively, and are connected to the water cooling system of the engine in the usual way. The heat exchange unit or core 41 is mounted within a housing 63 which is suitably secured to the front face of the dashboard 14. It will be apparent that this core 41 is upwardly extending and is as near as possible to the discharge opening 70. The blower housing 34 extends downwardly and has a lower portion 64 which is elbow shaped and connected to the housing 63 adjacent an inlet opening 66 in the backing plate of the housing 63, thereby communicating the air within the housing 34 with the interior of the heater. A plurality of curved baffle members 68 are spaced across the elbow portion 64 within the housing 34 in the path of air directed into the heater for evenly providing the air across the heating core 41 and for getting the air around this bend without undue swirling and consequent resistance.

For discharging the heated air from the heater and distributing the heated air within the passenger compartment, an opening 70 is provided through the dashboard 14, the opening 70 having substantially the same width as the heating core 41. An air distribution member 72 which is substantially coextensive with the opening 70 and which is preferably box-like in shape is mounted within the passenger compartment, and has a forwardly directed flange portion 74 which fits within the opening 70 for mounting the distribution member 72 and for communicating the interior of the distribution member 72 with the heating core.

The distribution member 72 includes a rear wall 76, and walls 77 and 78, and top and bottom walls 79 and 80. For distributing the air from the member 72 in all directions suitable outlet openings are provided in the walls forming the member 72. Openings 82 and 83 are provided through the rear wall 76 of the member 72; and adjustable shutter members 84 and 85, preferably pivotally mounted adjacent the upper edges thereof, are mounted over the openings 82 and 83, respectively, for controlling the direction and volume of air passing through the rear face of the distribution member 72. By pivotally mounting the shutter members along their upper edges, the air discharged from the member 72 through openings 82 and 83 is discharged in a downwardly direction against the feet of the occupants of the car so that the warm blasts of air are not directed against the faces of the occupants. Openings are also provided through the sides 77 and 78, and rearwardly directed louvers 86 and 87 are provided over these openings for directing the air toward the sides and rear of the vehicle. An opening is also provided through the bottom wall 80 and a downwardly and rearwardly extending louver 89 is provided over such opening for directing the air discharged therethrough downwardly and rearwardly of the vehicle.

Another substantially circular opening is provided through the bottom wall 80, the bottom wall adjacent such opening being formed with a downwardly extending short tubular member 90. An elongated flexible member 92 is suitably secured to the short tubular member 90 and extends under the floor of the vehicle to a position adjacent the forward portion of the rear passenger compartment. The rearmost end of the tubular member 92 communicates with the rear passenger compartment through an opening 94 in the floor of the vehicle, and a rearwardly directed baffle member 96 is mounted within the rear passenger compartment above the opening 94 for directing the heated air discharged into the rear compartment through the opening 94 against the feet of the occupants of the vehicle within the rear compartment.

For preventing the formation of frost and ice on the windshield of the vehicle, an opening is provided through the top wall 79 of the distribution member 72, the top wall 79 adjacent the opening therethrough being formed with a short tubular portion 98. An elongated flexible member 99 is suitably secured to the tubular portion 98 and extends upwardly to a position preferably adjacent the bottom of the inner face of the vehicle windshield. Heated air passing through the elongated conduit member 99 is thereby directed against the inner face of the windshield and prevents the formation of frost and ice thereon.

In certain cases, and usually in cases of extreme cold or in first starting, it may be desirable to provide for re-circulation of air within the passenger compartment in order to maintain a comfortable temperature within the passenger compartment. To provide for such re-circulation an opening 101 is provided in the rear wall of the conduit member 20 in alignment with an opening 102 in the dashboard 14. To communicate the interior of the conduit 20 with the interior of the passenger compartment through the openings 101 and 102, a short tubular member 103 extends through the opening 101 and is suitably secured to the conduit member 20. The tubular member 103 preferably telescopes within another tubular member 104 which extends through the opening 102 in the dashboard 14. A grille member 106 is preferably mounted to the rear face of the dashboard 14 in alignment with the passage formed by the members 103 and 104.

For controlling the passage of air through the conduit formed by the members 103 and 104 a shutter or damper member 108 is mounted within the conduit 20 by means of a bracket member 110 suitably secured to the conduit member 20. It will be apparent that damper member 108 will cut off the supply of fresh air as it opens up the recirculation opening 101. A hinge 112, preferably of the piano hinge type, is provided for pivotally mounting the shutter member 108 to the bracket 110.

For adjustably positioning the shutter member 108 an elongated member 114 is pivotally secured to the shutter member 108 and extends through the grille 106 to a position within the passenger compartment where it is conveniently accessible. A plurality of notches 116 are preferably provided along the bottom edge of the member 114, and such notches are adapted to engage a cooperating portion 118 formed on the grille member 106 for thereby holding the shutter in its adjusted position.

An annular resilient member 120 is secured to the front edge of the tubular member 103 within the conduit member 20 which resiliently engages the rear face of the shutter 108 when the shutter is in its normally closed position for effectively sealing the passage of air into the conduit member 20 from the passenger compartment.

In operation, upon rotation of the centrifugal blower 40 outside air passing inwardly through the opening 16 along the inlet conduit 20 into the blower is discharged downwardly therefrom for passage through the heat exchanger 41. The air passes from the heat exchanger through the opening 70 into the distribution member 72. From the distribution duct the air is discharged in all directions within the front passenger compartment and is also directed against the windshield and distributed within the rear passenger compartment.

If it is desired to re-circulate the air from within the passenger compartment the shutter 108, which is normally closed, may be opened and air from within the passenger compartment passes through the conduit formed by the members 103 and 104 and is intermingled within the inlet conduit 20 with the fresh air therein. The re-circulated air and fresh air are then caused to pass together through the blower and heater as described above.

Formal changes may be made in the specific embodiment of the invention described without departing from the spirit and substance of the invention, the scope of which is commensurate with the appended claims.

What is claimed is:

1. Vehicle ventilating and heating apparatus comprising an automotive vehicle having a dashboard and a windshield, means forming an upright fresh air inlet conduit mounted forwardly of said dashboard and communicating at its top with the exterior of said vehicle in the high pressure region forward of the windshield, said inlet conduit having an opening at its lower end and another opening above it, the second of said openings communicating directly with the interior of said vehicle through an opening in the dashboard for admission of air to be recirculated, a fan and heater unit mounted forwardly of said dashboard, the first of said openings communicating with the inlet of said fan and heater unit, and an air distribution means mounted rearwardly of said dashboard and communicating with said fan and heater unit through a second and lower opening in the dashboard.

2. Vehicle ventilating and heating apparatus for an automotive vehicle having a dashboard and a windshield, comprising means forming an upright fresh air inlet conduit mounted forwardly of said dashboard and communicating at its top with the exterior of said vehicle, said inlet conduit extending downwardly and having a lateral discharge opening adjacent the lower end thereof, a fan and heater unit, said discharge opening communicating with the inlet of the fan and heater unit, a downwardly sloping baffle member to stop foreign matter entering the fan mounted within said conduit adjacent the top of said discharge opening, and an air distribution means mounted rearwardly of said dashboard and communicating with said fan and heater unit through an opening in the dashboard.

3. For ready installation on the front of the dash or firewall and alongside of the engine of a conventional automobile; an upright heating and ventilating unit whose upper portion has a downwardly extending conduit whose top is adapted to communicate with an opening in the upwardly movable automobile hood, said unit having an outside forwardly extending substantially horizontal motor mounted on its front face and a downwardly discharging centrifugal blower therein aligned with and closely coupled to said motor, a heater core at the lower back portion of said unit and below said blower, and said unit having passages communicating the lower portion of said conduit with the intake of said blower, the downward discharge of said blower with said heater core, and the back of said heater core with the interior of the passenger compartment of the automobile through an opening in its dash.

4. Automobile vehicle heating and ventilating apparatus for installation in a conventional automotive vehicle having an upright forward dash or firewall separating the engine and passenger compartments and an upwardly movable hood covering the engine compartment, said movable hood having a fresh air intake opening in the high pressure region just in front of the dash, comprising an upright narrow heating and ventilating unit mounted on the forward side of said dash, said unit having an opening at its top registering with said hood opening when the hood is down and a downwardly extending air intake passage therein having a lower lateral opening, a centrifugal blower in said unit alongside of the lower part of said passage and connected to receive air from said lateral opening, a hot water heating core in the back of said unit adjacent the dash connected to receive air discharged from said blower, said dash and said unit each having an aligned opening behind said heating core leading into the passenger compartment.

5. For use in a conventional automobile having an upwardly extending forward firewall or dash separating the engine and passenger compartments through which there has been provided an opening at one side of the engine and having an upwardly movable hood over the engine compartment through which there has been provided an air intake opening in the high pressure region to one side and adjacent its rear and the dash; a readily installable upright fresh air heating and ventilating unit adapted to be mounted on the forward side of the dash at one side of the engine, said unit including an upright air intake passage having a closed bottom and whose top is adapted to communicate with the opening in the movable hood, said passage having an opening adjacent the bottom of its forward face, a blower compartment having an opening registering therewith, a horizontal axis centrifugal blower wheel therein immediately in front of and registering with said last mentioned opening, a forwardly extending electric motor outside of the forward face of said blower compartment having one end of its short horizontal shaft connected to and aligned with said blower wheel and removable as a unit with said blower wheel, a heater housing at the lower end of and communicating with said blower compartment to receive its discharge air and having a rear air discharge opening adapted to register with the dash opening, an upwardly extending heating core therein immediately in front of and adjacent to its air discharge opening.

6. For use in a conventional automobile having an upwardly extending forward firewall or dash separating the engine and passenger compartments through which there has been provided an opening at one side of the engine and having an upwardly movable hood over the engine compartment through which there has been provided an air intake opening in the high pressure region to one side and adjacent its rear and the dash; a readily installable upright fresh air heating and ventilating unit adapted to be mounted on the forward side of the dash at one side of the engine, said unit including an upright air intake having a closed bottom and whose top is adapted to communicate with the opening in the movable hood, said passage having an opening adjacent the bottom of its forward face, a blower compartment having an opening registering therewith, a horizontal axis centrifugal blower wheel therein immediately in front of and registering with said last mentioned opening, means to drive said blower wheel, a heater housing at the lower end of and communicating with said blower compartment to receive its discharge air and having a rear air discharge opening adapted to register with the dash opening, an upwardly extending heating core therein immediately in front of and adjacent to its air discharge opening.

7. Automotive vehicle heating and ventilating apparatus for installation in an automobile having a substantially horizontal fresh air intake opening in the high pressure region in front of its windshield, comprising a heating and ventilating unit including an upright downwardly extending passage communicating at its top with said air intake opening, an opening through said unit into said passage communicating it with the automobile passenger compartment for intake of recirculated air into the unit, a single adjustable damper member constructed and arranged to cut off the supply of fresh outside air as it uncovers said opening for admission of recirculated air and vice versa, a heating core and a fan housed in said unit which has openings communicating them with the lower portion of said passage and with the passenger compartment for discharge of heated air.

8. Automotive vehicle heating and ventilating apparatus for installation in an automobile having a substantially horizontal fresh air intake opening in the high pressure region in front of its windshield, comprising a heating and ventilating unit including an upright downwardly extending passage having a closed bottom and communicating at its top with said air intake opening, said unit including a housing having therein a substantially horizontal axis centrifugal blower wheel, said housing having an opening for admission of air axially into said blower wheel and communicating with said closed bottom passage slightly above the bottom thereof to form a trap for foreign materials, said unit also including a housing having therein a heating core and having openings communicating with the discharge of said blower housing and with the passenger compartment of the automobile for delivery of heated air.

9. An upright heating and ventilating unit comprising a casing adapted to be mounted on the dash of a conventional automobile, said casing having an air intake opening at its upper end adapted to communicate with the outside air through an opening in the high pressure region on said vehicle forward of its windshield, a downwardly blowing fan in said casing, an upwardly extending heater core in said casing below said fan to receive air from the fan, a baffle member between said fan and said heater core to turn and distribute the air across the core face, and a heated-air discharge opening communicating the other side of said core directly to the interior of the vehicle body.

ALFRED R. LINTERN.
PETER J. MILLER.
WILLIAM T. DOWNS.